(12) United States Patent
Iinuma

(10) Patent No.: US 7,597,437 B2
(45) Date of Patent: Oct. 6, 2009

(54) INK JET INK COMPOSITION, INK SET AND INK JET TREATMENT LIQUID, AND INK JET RECORDING METHOD AND INK JET RECORDING APPARATUS USING THE SAME

(75) Inventor: Taiga Iinuma, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/650,490

(22) Filed: Jan. 8, 2007

(65) Prior Publication Data

US 2007/0109380 A1 May 17, 2007

Related U.S. Application Data

(62) Division of application No. 10/824,367, filed on Apr. 15, 2004.

(30) Foreign Application Priority Data

Apr. 16, 2003 (JP) .............................. 2003-111260

(51) Int. Cl.
C09D 11/00 (2006.01)
(52) U.S. Cl. .................................. 347/100; 106/31.13
(58) Field of Classification Search ................. 347/100; 106/31.13
See application file for complete search history.

(56) References Cited

U.S. PATENT DOCUMENTS

| 4,849,773 | A | | 7/1989 | Owatari |
| 4,973,992 | A | | 11/1990 | Owatari |
| 5,173,112 | A | * | 12/1992 | Matrick et al. ........... 106/31.43 |
| 5,462,590 | A | | 10/1995 | Yui et al. |
| 5,693,129 | A | | 12/1997 | Lin |
| 5,759,701 | A | | 6/1998 | Malhotra |
| 5,777,023 | A | * | 7/1998 | Pavlin ........................ 524/590 |
| 5,873,978 | A | | 2/1999 | Kuroyama et al. |
| 6,025,412 | A | | 2/2000 | Sacripante et al. |
| 6,048,390 | A | | 4/2000 | Yano et al. |
| 6,084,619 | A | | 7/2000 | Takemoto et al. |
| 6,387,506 | B1 | * | 5/2002 | Kawamura et al. .......... 428/413 |
| 6,471,348 | B1 | * | 10/2002 | Koitabashi ................... 347/100 |
| 6,815,474 | B2 | * | 11/2004 | Malanga et al. ............. 523/414 |
| 2002/0008747 | A1 | * | 1/2002 | Kaga et al. .................. 347/102 |
| 2002/0050226 | A1 | | 5/2002 | Oki et al. |
| 2003/0174193 | A1 | * | 9/2003 | Sago et al. .................. 347/100 |
| 2004/0231556 | A1 | | 11/2004 | Shimomura et al. |

FOREIGN PATENT DOCUMENTS

| EP | 0 972 651 A1 | 1/2000 |
| JP | A-54-161403 | 12/1979 |
| JP | A-6-157955 | 6/1994 |
| JP | A-8-310111 | 11/1996 |
| JP | A-9-176538 | 7/1997 |
| JP | A-9-234946 | 9/1997 |
| JP | A-10-204348 | 8/1998 |
| JP | A-10-278413 | 10/1998 |
| JP | A-2000-309155 | 11/2000 |
| JP | A-2002-137374 | 5/2002 |
| JP | A-2002-292856 | 10/2002 |

* cited by examiner

*Primary Examiner*—Manish S Shah
*Assistant Examiner*—Laura E Martin
(74) *Attorney, Agent, or Firm*—Oliff & Berridge, PLC

(57) ABSTRACT

The present invention provides an ink jet ink composition containing at least water, a colorant and a water soluble organic solvent. The ink jet ink composition contains at least one amine compound represented by the following formula (1) in a range of 10 to 30% by mass:

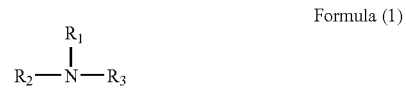

Formula (1)

wherein the amine compound represented by the formula (1) is any one of primary to tertiary amine compounds; at least one of three substituents represented by $R_1$, $R_2$ and $R_3$ in the formula (1) includes a hydrocarbon group having a hydroxyl group; and none of the three substituents contain an alkyl group having at its terminal either one of $-CO_2M$ and $-SO_3M$ in which M represents an atom or an atomic group selected from hydrogen, an alkali metal, an alkaline earth metal, an ammonium group and an organic amine group.

22 Claims, No Drawings

INK JET INK COMPOSITION, INK SET AND INK JET TREATMENT LIQUID, AND INK JET RECORDING METHOD AND INK JET RECORDING APPARATUS USING THE SAME

CROSS-REFERENCE TO RELATED APPLICATION

This is a Division of application Ser. No. 10/824,367 filed Apr. 15, 2004, which claims priority under 35 USC 119 from Japanese Patent Application No. 2003-111260. The disclosure of the prior application is hereby incorporated by reference herein in its entirety.

BACKGROUND OF THE INVENTION

1. Field of the Invention

The present invention relates to an ink jet ink composition, an ink-set and an ink jet treatment liquid which are used for an ink jet recording apparatus (e.g., a printer, a copier, a facsimile, or a word processor), and an ink jet recording method and an ink jet recording apparatus which use the ink jet ink composition, the ink-set and the ink jet treatment liquid.

2. Description of the Related Art

A so-called ink jet recording apparatus in which a liquid or a molten solid ink is ejected through a nozzle, slit, porous film or the like to record onto paper, cloth, film, or the like has various advantages such as being compact, inexpensive and quiet. Many kinds of these recording apparatuses including not only monochrome printers, but also color printers capable of recording full-color images, with which a good quality is obtained on plain paper such as report paper, copy paper, or the like, have been recently sold in the market, and thereby occupy a large share for the market of recording apparatus. Among these ink jet recording apparatuses, so-called piezo ink jet printers using piezoelectric elements, and so-called thermal ink jet recording apparatuses which use heat energy to form droplets and then print have various advantages such as high printing speed and high resolution.

The ink used in the ink jet recording apparatus mainly contains a solvent, a colorant and additives. The following characteristics are required for the ink jet recording ink: that the ink can provide uniform, blotting-free and fog-free images with high resolution and high density; that the ink causes no clogging at the tip of the nozzle due to dried ink and always exhibits good ejecting responsiveness and good ejecting stability; that the ink rapidly dries on paper; that the ink has good image fastness; and the ink has good long-term storage stability.

In addition, there is a need for an ink having characteristics such that it relieves or suppress a noticeable incidence of curling of a recording medium such as regular paper. Curl refers to a phenomenon in which a recording medium becomes rounded during or after printing.

The curled recording medium is quite inconvenient since the recording medium cannot be piled or spread out into a sheet. Curl of the sheet is particularly a problem when color graphic images having many solid printing portions are continuously printed at a high speed. Moreover, since curl makes it difficult to print on both faces, it is necessary to suppress and relieve curling of recording media for this reason as well.

It has been proposed to use 1,3-diols, 1,3,5-triols and amino-1,3-diols as anti-curl agents in the ink in order to suppress curling (see Japanese Patent Application Laid-Open (JP-A) No. 6-157955). Adding amide compounds in the ink as the anti-curl agent has been also proposed (see JP-A No. 9-176538). Adding hydroxyamide derivatives in the ink as the anti-curl agent has been further proposed (see JP-A No. 10-204348).

However, although these methods can suppress curling, a large quantity of the anti-curl agent must be added in he ink to suppress curling. Accordingly, the ink in which a large quantity of the anti-curl agent is added causes insufficient image quality, clogging of nozzles, lower apparatus reliability, and the like. Thus, these methods are not sufficient.

Some techniques for suppressing curl by treating a recording medium have been proposed. For example, a method in which a back-coat layer is provided at a surface opposite from an ink receiving layer of the recording medium (see JP-A No. 8-310111) has been proposed. Also, it has been proposed to use a regular paper type recording medium in which irreversible shrinkage factors of the paper in a machine direction (MD) and a cross direction (CD) when the relative humidity is changed are controlled (see JP-A No. 9-234946). A method for controlling the degree of curl size of a coating layer and a surface opposite from the coating layer has been further proposed (see JP-A No. 10-278413).

However, although some effects of improving curl is obtained with these conventional techniques, these are not sufficient. Since users are required to purchase recording media treated with the anti-curl agent, convenience for general users is compromised. Considering user convenience, an ink that is able to prevent curling when any recording media is used for printing is more convenient and more desired than the recording medium treated with the anti-curl agent.

SUMMARY OF THE INVENTION

The present invention has been made in view of the above circumstances. First, the invention is to provide an ink jet ink composition, an ink set, an ink jet treatment liquid, an ink jet recording method and an ink jet recording apparatus that can relieve or suppress curling of the recording medium and clogging of nozzles.

Secondly, the invention is to provide an ink jet ink composition, an ink set, an ink jet treatment liquid, an ink jet recording method and an ink jet recording apparatus that can relieve or suppress curling of the recording medium and clogging of nozzle, as well as further improve image density.

The inventor of the invention has investigated the mechanism by which curl occurs.

In general, curl is believed to occur due to permeation of water contained in the ink among cellulose fibers in the recording medium during printing and breaking of hydrogen bonds among the fibers by the permeated water. While the hydrogen bonds broken by water in the ink reform as the water is evaporated, the hydrogen bonds are formed among closer hydroxyl groups. Consequently, cellulose fibers are rearranged to shorten the distances among the cellulose fibers, whereby the entire recording medium shrinks.

The ink is usually ejected to print on one surface of the recording medium during printing in the ink jet recording apparatus. Since the recording medium is shrunk only on its printed surface, it is presumed that a difference in shrinkage factor is caused between the printed surface and the non-printed surface, whereby the recording medium curls.

A first aspect of the invention is to provide an ink jet ink composition comprising at least water, a colorant and a water-soluble organic solvent, wherein the ink jet ink composition comprises at least one amine compound represented by the following formula (1) in a range of 10 to 30% by mass:

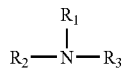

Formula (1)

wherein the amine compound represented by the formula (1) is any one of primary to tertiary amine compounds; at least one of three substituents represented by $R_1$, $R_2$ and $R_3$ in the formula (1) comprises a hydrocarbon group having a hydroxyl group; and none of the three substituents contain an alkyl group having at its terminal either one of —$CO_2M$ and —$SO_3M$ in which M represents an atom or an atomic group selected from hydrogen, an alkali metal, an alkaline earth metal, an ammonium group and an organic amine group.

A second aspect of the invention is to provide an ink jet ink composition comprising at least water, a colorant and a water-soluble organic solvent, wherein the ink jet ink composition comprises at least one amine compound represented by the following formula (2):

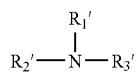

Formula (2)

wherein the amine compound represented by the formula (2) is any one of primary to tertiary amine compounds; at least one of three substituents represented by $R_1'$, $R_2'$ and $R_3'$ in the formula (2) comprises a hydrocarbon group having a hydroxyl group; and at least one of the three substituents comprises a hydrocarbon group containing an alkyl group having at its terminal either one of —$CO_2M$ and —$SO_3M$ in which M represents an atom or an atomic group selected from hydrogen, an alkali metal, an alkaline earth metal, an ammonium group and an organic amine group.

A third aspect of the invention is to provide an ink jet recording method comprising forming an image by adhering an ink jet ink composition comprising at least water, a colorant and a water soluble organic solvent, to a recording medium, wherein the ink jet ink composition comprises at least one amine compound represented by the following formula (1) in a range of 10 to 30% by mass:

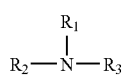

Formula (1)

wherein the amine compound represented by the formula (1) is any one of primary to tertiary amine compounds; at least one of three substituents represented by $R_1$, $R_2$ and $R_3$ in the formula (1) comprises a hydrocarbon group having a hydroxyl group; and none of the three substituents contain an alkyl group having at its terminal either one of —$CO_2M$ and —$SO_3M$ in which M represents an atom or an atomic group selected from hydrogen, an alkali metal, an alkaline earth metal, an ammonium group and an organic amine group.

A fourth aspect of the invention is to provide an ink jet recording method comprising forming an image by adhering an ink jet ink composition comprising at least water, a colorant and a water soluble organic solvent, to a recording medium, wherein the ink jet ink composition comprises at least one amine compound represented by the following formula (2):

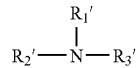

Formula (2)

wherein the amine compound represented by the formula (2) is any one of primary to tertiary amine compounds; at least one of three substituents represented by $R_1'$, $R_2'$ and $R_3'$ in the formula (2) comprises a hydrocarbon group having a hydroxyl group; and at least one of the three substituents comprises a hydrocarbon group containing an alkyl group having at its terminal either one of —$CO_2M$ and —$SO_3M$ in which M represents an atom or an atomic group selected from hydrogen, an alkali metal, an alkaline earth metal, an ammonium group and an organic amine group.

A fifth aspect of the invention is to provide an ink jet recording apparatus comprising at least a recording head including a liquid ejection surface having a nozzle for ejecting a liquid, and a recording medium transfer section for transferring a recording medium in one direction while the recording medium faces the liquid ejection surface and a shortest distance between the recording medium and the liquid ejection surface is constantly maintained, wherein:

during printing, an image is formed by ejecting the liquid onto a surface of the recording medium from the liquid ejection surface while moving the recording head in a direction substantially perpendicular to the transfer direction of the recording medium;

an ink jet ink composition comprising at least water, a colorant and a water soluble organic solvent is used as the liquid; and the ink jet ink composition comprises at least one amine compound represented by the following formula (1) in a range of 10 to 30% by mass,

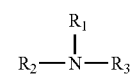

Formula (1)

wherein the amine compound represented by the formula (1) is any one of primary to tertiary amine compounds; at least one of three substituents represented by $R_1$, $R_2$ and $R_3$ in the formula (1) comprises a hydrocarbon group having a hydroxyl group; and none of the three substituents contain an alkyl group having at its terminal either one of —$CO_2M$ and —$SO_3M$ in which M represents an atom or an atomic group selected from hydrogen, an alkali metal, an alkaline earth metal, an ammonium group and an organic amine group.

A sixth aspect of the invention is to provide an ink jet recording apparatus comprising at least a recording head including a liquid ejection surface having a nozzle for ejecting a liquid, and a recording medium transfer section for transferring a recording medium in one direction while the recording medium faces the liquid ejection surface and a shortest distance between the recording medium and the liquid ejection surface is constantly maintained, wherein:

during printing, an image is formed by ejecting the liquid onto a surface of the recording medium from the liquid ejection surface while moving the recording head in a direction substantially perpendicular to the transfer direction of the recording medium;

an ink jet ink composition comprising at least water, a colorant and a water soluble organic solvent is used as the liquid; and the ink jet ink composition comprises at least one amine compound represented by the following formula (2),

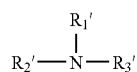

Formula (2)

wherein the amine compound represented by the formula (2) is any one of primary to tertiary amine compounds; at least one of three substituents represented by $R_1'$, $R_2'$ and $R_3'$ in the formula (2) comprises a hydrocarbon group having a hydroxyl group; and at least one of the three substituents comprises a hydrocarbon group containing an alkyl group having at its terminal either one of —$CO_2M$ and —$SO_3M$ in which M represents an atom or an atomic group selected from hydrogen, an alkali metal, an alkaline earth metal, an ammonium group and an organic amine group.

A seventh aspect of the invention is to provide an ink set comprising at least two inks which each comprise water, a colorant and a water soluble organic solvent, wherein at least one ink in the ink set comprises at least one amine compound represented by the following formula (1) in a range of 10 to 30% by mass:

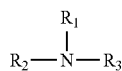

Formula (1)

wherein the amine compound represented by the formula (1) is any one of primary to tertiary amine compounds; at least one of three substituents represented by $R_1$, $R_2$ and $R_3$ in the formula (1) comprises a hydrocarbon group having a hydroxyl group; and none of the three substituents contain an alkyl group having at its terminal either one of —$CO_2M$ and —$SO_3M$ in which M represents an atom or an atomic group selected from hydrogen, an alkali metal, an alkaline earth metal, an ammonium group and an organic amine group.

An eighth aspect of the invention is to provide an ink set comprising at least two inks which each comprise water, a colorant and a water soluble organic solvent, wherein at least one ink in the ink set comprises at least one amine compound represented by the following formula (2):

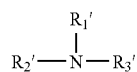

Formula (2)

wherein the amine compound represented by the formula (2) is any one of primary to tertiary amine compounds; at least one of three substituents represented by $R_1'$, $R_2'$ and $R_3'$ in the formula (2) comprises a hydrocarbon group having a hydroxyl group; and at least one of the three substituents comprises a hydrocarbon group containing an alkyl group having at its terminal either one of —$CO_2M$ and —$SO_3M$ in which M represents an atom or an atomic group selected from hydrogen, an alkali metal, an alkaline earth metal, an ammonium group and an organic amine group.

A ninth aspect of the invention is to provide an ink jet recording method comprising forming an image by using an ink set containing at least two inks comprising at least water, a colorant and a water soluble organic solvent, and by adhering an ink of the ink set to a recording medium, wherein at least one ink of the ink set comprises at least one amine compound represented by the following formula (1) in a range of 10 to 30% by mass:

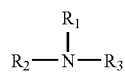

Formula (1)

wherein the amine compound represented by the formula (1) is any one of primary to tertiary amine compounds; at least one of three substituents represented by $R_1$, $R_2$ and $R_3$ in the formula (1) comprises a hydrocarbon group having a hydroxyl group; and none of the three substituents contain an alkyl group having at its terminal either one of —$CO_2M$ and —$SO_3M$ in which M represents an atom or an atomic group selected from hydrogen, an alkali metal, an alkaline earth metal, an ammonium group and an organic amine group.

A tenth aspect of the invention is to provide an ink jet recording method comprising forming an image by using an ink set containing at least two inks comprising at least water, a colorant and a water soluble organic solvent, and by adhering an ink of the ink set to a recording medium, wherein at least one ink of the ink set comprises at least one amine compound represented by the following formula (2):

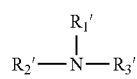

Formula (2)

wherein the amine compound represented by the formula (2) is any one of primary to tertiary amine compounds; at least one of three substituents represented by $R_1'$, $R_2'$ and $R_3'$ in the formula (2) comprises a hydrocarbon group having a hydroxyl group; and at least one of the three substituents comprises a hydrocarbon group containing an alkyl group having at its terminal either one of —$CO_2M$ and —$SO_3M$ in which M represents an atom or an atomic group selected from hydrogen, an alkali metal, an alkaline earth metal, an ammonium group and an organic amine group.

An eleventh aspect of the invention is to provide an ink jet recording apparatus comprising at least a recording head including a liquid ejection surface having at least two nozzles for independently ejecting at least two liquids, and a recording medium transfer section for transferring a recording medium in one direction while the recording medium faces the liquid ejection surface and a shortest distance between the recording medium and the liquid ejection surface is constantly maintained, wherein:

during printing, an image is formed by ejecting the at least two liquids onto a surface of the recording medium from the liquid ejection surface while moving the recording head in a direction substantially perpendicular to the transfer direction of the recording medium;

an ink set comprising at least two inks comprising at least water, a colorant and a water soluble organic solvent is used as the at least two liquids; and at least one ink in the ink set comprises at least one amine compound represented by the following formula (1) in a range of 10 to 30% by mass,

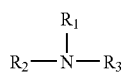

Formula (1)

wherein the amine compound represented by the formula (1) is any one of primary to tertiary amine compounds; at least one of three substituents represented by $R_1$, $R_2$ and $R_3$ in the formula (1) comprises a hydrocarbon group having a hydroxyl group; and none of the three substituents contain an alkyl group having at its terminal either one of —$CO_2M$ and —$SO_3M$ in which M represents an atom or an atomic group selected from hydrogen, an alkali metal, an alkaline earth metal, an ammonium group and an organic amine group.

A twelfth aspect of the invention is to provide an ink jet recording apparatus comprising at least a recording head including a liquid ejection surface having at least two nozzles for independently ejecting at least two liquids, and a recording medium transfer section for transferring a recording medium in one direction while the recording medium faces the liquid ejection surface and a shortest distance between the recording medium and the liquid ejection surface is constantly maintained, wherein:

during printing, an image is formed by ejecting the at least two liquids onto a surface of the recording medium from the liquid ejection surface while moving the recording head in a direction substantially perpendicular to the transfer direction of the recording medium;

an ink set comprising at least two inks comprising at least water, a colorant and a water soluble organic solvent is used as the at least two liquids; and at least one ink in the ink set comprises at least one amine compound represented by the following formula (2):

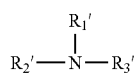

Formula (2)

wherein the amine compound represented by the formula (2) is any one of primary to tertiary amine compounds; at least one of three substituents represented by $R_1'$, $R_2'$ and $R_3'$ in the formula (2) comprises a hydrocarbon group having a hydroxyl group; and at least one of the three substituents comprises a hydrocarbon group containing an alkyl group having at its terminal either one of —$CO_2M$ and —$SO_3M$ in which M represents an atom or an atomic group selected from hydrogen, an alkali metal, an alkaline earth metal, an ammonium group and an organic amine group.

A thirteenth aspect of the invention is to provide a colorless ink jet treatment liquid which is used together with an ink jet ink composition comprising at least water, a colorant and a water soluble organic solvent, during printing, and comprises at least water and a water soluble organic solvent, wherein the ink jet treatment liquid comprises at least one amine compound represented by the following formula (1) in a range of 10 to 30% by mass:

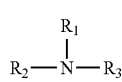

Formula (1)

wherein the amine compound represented by the formula (1) is any one of primary to tertiary amine compounds; at least one of three substituents represented by $R_1$, $R_2$ and $R_3$ in the formula (1) comprises a hydrocarbon group having a hydroxyl group; and none of the three substituents contain an alkyl group having at its terminal either one of —$CO_2M$ and —$SO_3M$ in which M represents an atom or an atomic group selected from hydrogen, an alkali metal, an alkaline earth metal, an ammonium group and an organic amine group.

A fourteenth aspect of the invention is to provide a colorless ink jet treatment liquid which is used together with an ink jet ink composition comprising at least water, a colorant and a water soluble organic solvent, during printing, and comprises at least water and a water soluble organic solvent, wherein the ink jet treatment liquid comprises at least one amine compound represented by the following formula (2):

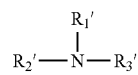

Formula (2)

wherein the amine compound represented by the formula (2) is any one of primary to tertiary amine compounds; at least one of three substituents represented by $R_1'$, $R_2'$ and $R_3'$ in the formula (2) comprises a hydrocarbon group having a hydroxyl group; and at least one of the three substituents comprises a hydrocarbon group containing an alkyl group having at its terminal either one of —$CO_2M$ and —$SO_3M$ in which M represents an atom or an atomic group selected from hydrogen, an alkali metal, an alkaline earth metal, an ammonium group and an organic amine group.

A fifteenth aspect of the invention is to provide an ink jet recording method comprising forming an image by adhering an ink jet ink composition comprising at least water, a colorant and a water soluble organic solvent, and a colorless ink jet treatment liquid comprising at least water and a water soluble organic solvent, to approximately the same region on a recording medium, wherein the ink jet treatment liquid comprises at least one amine compound represented by the following formula (1) in a range of 10 to 30% by mass:

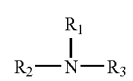

Formula (1)

wherein the amine compound represented by the formula (1) is any one of primary to tertiary amine compounds; at least one of three substituents represented by $R_1$, $R_2$ and $R_3$ in the formula (1) comprises a hydrocarbon group having a hydroxyl group; and none of the three substituents contain an alkyl group having at its terminal either one of —$CO_2M$ and —$SO_3M$ in which M represents an atom or an atomic group selected from hydrogen, an alkali metal, an alkaline earth metal, an ammonium group and an organic amine group.

A sixteenth aspect of the invention is to provide an ink jet recording method comprising forming an image by adhering an ink jet ink composition comprising at least water, a colorant and a water soluble organic solvent, and a colorless ink jet treatment liquid comprising at least water and a water soluble organic solvent, to approximately the same region on a recording medium, wherein the ink jet treatment liquid comprises at least one amine compound represented by the following formula (2):

Formula (2)

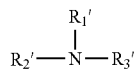

wherein the amine compound represented by the formula (2) is any one of primary to tertiary amine compounds; at least one of three substituents represented by $R_1'$, $R_2'$ and $R_3'$ in the formula (2) comprises a hydrocarbon group having a hydroxyl group; and at least one of the three substituents comprises a hydrocarbon group containing an alkyl group having at its terminal either one of —$CO_2M$ and —$SO_3M$ in which M represents an atom or an atomic group selected from hydrogen, an alkali metal, an alkaline earth metal, an ammonium group and an organic amine group.

A seventeenth aspect of the invention is to provide an ink jet recording apparatus comprising at least a recording head including a liquid ejection surface comprising at least two nozzles for independently ejecting at least two liquids, and a recording medium transfer section for transferring a recording medium in one direction while the recording medium faces the liquid ejection surface and a shortest distance between the recording medium and the liquid ejection surface is constantly maintained, wherein:

during printing, an image is formed by ejecting the at least two liquids onto a surface of the recording medium from the liquid ejection surface while moving the recording head in a direction substantially perpendicular to the transfer direction of the recording medium;

an ink jet ink composition comprising at least water, a colorant and a water soluble organic solvent, and a colorless ink jet treatment liquid comprising at least water and a water soluble organic solvent are used as the at least two liquids; and the ink jet treatment liquid comprises at least one amine compound represented by the following formula (1) in a range of 10 to 30% by mass:

Formula (1)

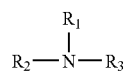

wherein the amine compound represented by the formula (1) is any one of primary to tertiary amine compounds; at least one of three substituents represented by $R_1$, $R_2$ and $R_3$ in the formula (1) comprises a hydrocarbon group having a hydroxyl group; and none of the three substituents contain an alkyl group having at its terminal either one of —$CO_2M$ and —$SO_3M$ in which M represents an atom or an atomic group selected from hydrogen, an alkali metal, an alkaline earth metal, an ammonium group and an organic amine group.

An eighteenth aspect of the invention is to provide an ink jet recording apparatus comprising at least a recording head including a liquid ejection surface comprising at least two nozzles for independently ejecting at least two liquids, and a recording medium transfer section for transferring a recording medium in one direction while the recording medium faces the liquid ejection surface and a shortest distance between the recording medium and the liquid ejection surface is constantly maintained, wherein:

during printing, an image is formed by ejecting the at least two liquids onto a surface of the recording medium from the liquid ejection surface while moving the recording head in a direction substantially perpendicular to the transfer direction of the recording medium;

an ink jet ink composition comprising at least water, a colorant and a water soluble organic solvent, and a colorless ink jet treatment liquid comprising at least water and a water soluble organic solvent are used as the at least two liquids; and, the ink jet treatment liquid comprises at least one amine compound represented by the following formula (2), Formula (2)

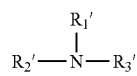

wherein the amine compound represented by the formula (2) is any one of primary to tertiary amine compounds; at least one of three substituents represented by $R_1'$, $R_2'$ and $R_3'$ in the formula (2) comprises a hydrocarbon group having a hydroxyl group; and at least one of the three substituents comprises a hydrocarbon group containing an alkyl group having at its terminal either one of —$CO_2M$ and —$SO_3M$ in which M represents an atom or an atomic group selected from hydrogen, an alkali metal, an alkaline earth metal, an ammonium group and an organic amine group.

DETAILED DESCRIPTION OF THE INVENTION

The first major aspect and the second major aspect of the present invention will be sequentially described by dividing into an ink jet ink composition (may be referred to as an ink hereinafter), an ink set, an ink jet treatment liquid, an ink jet recording method and an ink jet recording apparatus. When the descriptions refer to both "first major aspect" and "second major aspect" in the descriptions below, they may be simply referred to as "the invention".

<Ink Jet Ink Composition, Ink Set and Ink Jet Treatment Liquid>

-Ink Jet Ink Composition-

The first major aspect and the second major aspect of the ink jet ink compositions of the invention will be described separately at first, and matters common to both of them will be described thereafter.

The ink jet ink composition according to the first major aspect of the invention comprises at least water, a colorant and a water-soluble organic solvent, and comprises at least one amine compound represented by the following formula (1) in a range of 10 to 30% by mass.

Formula (1)

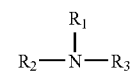

The amine compound represented by the formula (1) is any one of primary to tertiary amine compounds; at least one of three substituents represented by $R_1$, $R_2$ and $R_3$ in the formula (1) comprises a hydrocarbon group having a hydroxyl group; and none of the three substituents contain an alkyl group having at its terminal either one of —$CO_2M$ and —$SO_3M$ in which M represents an atom or an atomic group selected from hydrogen, an alkali metal, an alkaline earth metal, an ammonium group and an organic amine group.

The ink jet ink composition of the first major aspect of the invention can relieve or suppress curling of the recording medium and clogging of the nozzles.

Such effect has been found by the inventor, in the process of investigations for preventing curling, in cases where ink contains the amine compound represented by the formula (1) in the range of 10 to 30% by mass.

While the mechanism of the curling preventing effect of the amine compound represented by the formula (1), which is added to the ink of the first major aspect of the invention, is not entirely clear, the inventor of the invention presumes that the mechanism is as follows from various results and discoveries obtained in the process of investigations of the invention.

The amine compound represented by the formula (1) has a hydroxyl group as a substituent of the nitrogen atom. When the ink containing the compound is ejected from a recording head of the ink jet recording apparatus and permeates into a recording medium, permeation is accelerated by the effect of the nitrogen atom having a high affinity with cellulose, and the amine compound represented by the formula (1) permeates deep into cellulose fibers.

After permeation of the amine compound represented by the formula (1) into the cellulose fibers, hydrogen bonds are formed between the hydroxyl group contained in the substituent linked to the nitrogen atom and the hydroxyl group of the cellulose. In addition, since the nitrogen atom in the amine molecule has an affinity with the hydrogen atom of the hydroxyl group of cellulose, physical bonds are presumed to be formed between the amine molecule and cellulose fibers.

The amine compound represented by the formula (1) is aligned among the cellulose fibers by the two bonds described above, and a structure comprising cross-links among the cellulose fibers is formed. Since the amine compound represented by the formula (1) does not move in the recording medium due to the bonds, whereby the cross-linking structure among the cellulose fibers can be maintained, the distance among the cellulose fibers can be prevented from shortening even when water is evaporated off from the recording medium. Consequently, occurrence of curling is suppressed.

The amine compound represented by the formula (1) is highly hydrophilic and the compound also acts as a humectant. Accordingly, water that has permeated into the recording medium during the printing process can be maintained and rapid evaporation of water is suppressed. Since such a function is able to retard reconstruction of the hydrogen bonds and shortening of inter-cellulose distances caused by evaporation of water, it is possible for the amine molecule itself to become aligned along the hydroxyl groups of the cellulose fiber.

In other words, the amine molecule itself is able to establish an environment for facilitating alignment among the cellulose fibers, due to its humectant action. This humectant action enhances an effect for suppressing shortening of the inter-cellulose distances to consequently result in suppression of curling.

Moreover, since the amine compound represented by the formula (1) has an excellent humectant effect, evaporation of water in the ink filled in the recording head through an ejection nozzle can also be suppressed. Accordingly, clogging is also unlikely to occur.

The content of the amine compound represented by the formula (1) is not particularly limited as long as it is in the range of 10 to 30% by mass. A range of 13 to 25% by mass is preferable, and a range of 15 to 20% by mass is more preferable.

The curl-preventing effect cannot be obtained when the content of the amine compound represented by the formula (1) is less than 10% by mass, while clogging are generated when the content exceeds 30% by mass.

The amine compound used in the first major aspect of the invention is not particularly limited so long as at least one of the three substutitents represented by $R_1$, $R_2$ and $R_3$ in the formula (1) which are linked to the nitrogen atom comprises a hydrocarbon group having a hydroxyl group, and none of the three substituents contain an alkyl group having at its terminal either one of —$CO_2M$ and —$SO_3M$ (M represents an atom or an atomic group selected from hydrogen, an alkali metal, an alkaline earth metal, an ammonium group and an organic amine group).

The phrase "a hydrocarbon group having a hydroxyl group" as used in the invention means known hydrocarbon groups having at least one hydroxyl group. The structure thereof is not particularly limited.

However, based on the considerations described above, the amine compound used in the first major aspect of the invention preferably satisfies the following conditions (1) to (3) from the viewpoint of facilitating the cross-linking structure between the cellulose fiber and the amine compound:

(1) the hydroxyl group is positioned at the outermost side of the amine molecule;
(2) at least one hydroxyl group is contained in respective substituents $R_1$, $R_2$ and $R_3$; and
(3) the substituents $R_1$, $R_2$ and $R_3$ are not spatially bulky in order to facilitate other molecules and polymers to approach the nitrogen atom positioned at the center of the amine molecule, and the amine compound used in the first major aspect of the invention preferably satisfies the following condition (4) from the view point of maintaining an appropriate distance between the cross-linking cellulose fibers that is neither too long nor too short (4) at least the substituent containing the hydroxyl group of the substituents $R_1$, $R_2$ and $R_3$ has an appropriate length.

It is preferable to satisfy the conditions of above (1) to (4).

However, it is practically preferable that the hydroxyl group is contained in any two of the substituents $R_1$, $R_2$ and $R_3$ with respect to the condition (2). This is because the amine compound containing at least one hydroxyl group in respective substituents $R_1$, $R_2$ and $R_3$ has a molecular structure that is decomposed over time, and the product formed by decomposition becomes yellowish.

The hydroxyl group is preferably positioned at the terminal of the hydrocarbon group having the hydroxyl group for satisfying the condition (1). A terminal functional group may interfere with the cross-linking structure between the hydroxyl group and cellulose fiber when the hydroxyl group is positioned at a position other than the terminal of the hydrocarbon group having the hydroxyl group.

The hydrocarbon group having the hydroxyl group preferably comprises the hydrocarbon groups having the hydroxyalkyl group, more preferably only the hydroxyalkyl group for satisfying the condition (3).

When the hydroxyl group in the hydrocarbon group is an aromatic group having the hydroxyl group, the substituent R (the substituent R means at least any one of $R_1$, $R_2$ and $R_3$ hereinafter) is so spatially bulky that other molecules and polymers may be blocked from approaching the nitrogen atom positioned at the center of the amine molecule. The hydroxyalkyl group is preferably a linear hydroxyalkyl group rather than a branched hydroxyalkyl group for reducing the spatial bulkiness.

The carbon number of the hydrocarbon group containing the hydroxyl group is preferably in the range of 1 to 5, more preferably in the range of 1 to 3 and further preferably 1 or 2 for satisfying the condition (4) when the hydrocarbon group having the hydroxyl group comprises a hydroxyalkyl group.

The cross-linking distance of the cross-linking made by amine molecule between the cellulose fibers may be too short when the carbon number is zero, or when the hydroxyl group is directly linked to the nitrogen atom. The cross-linking distance may be too long when the carbon number exceeds 5.

When the hydrocarbon group having the hydroxyl group has a structure other than the linear hydroxyalkyl group, or when hydrocarbon group having the hydroxyl group contains the linear hydroxyalkyl group (for example when the linear hydroxyalkyl group is linked to the benzene ring), the length of the hydrocarbon group containing the hydroxyl group having the structure as described above preferably corresponds to the length of the hydroxyalkyl group having a carbon number in the range of 1 to 5.

Examples of the amine molecule available having the hydrocarbon group containing the hydroxyl group as described above include bis(hydroxyalkyl)monoalkylamines such as N-ethyl diethanolamine, tris(hydroxyalkyl)amines such as tris(2-hydroxyethyl)amine, 1-[N,N-bis(2-hydroxyethyl)amino]-2-propanol and 2,2-bis(hydroxymethyl)-2,2,', 2"-nitriloethanol, and monohydroxyalkyl amines such as 2-aminoethanol.

The ink jet ink composition according to the second major aspect of the invention will be described below. The ink jet ink composition of the second major aspect of the invention comprises at least water, a colorant and water-soluble organic solvent, and comprises at least one amine compound represented by the formula 2.

Formula (2)

The amine compound represented by the formula (2) is any one of primary to tertiary amine compounds; at least one of three substituents represented by $R_1'$, $R_2'$ and $R_3'$ in the formula (2) comprises a hydrocarbon group having a hydroxyl group; and at least one of the three substituents comprises a hydrocarbon group containing an alkyl group having at its terminal either one of —$CO_2M$ and —$SO_3M$ in which M represents an atom or an atomic group selected from hydrogen, an alkali metal, an alkaline earth metal, an ammonium group and an organic amine group.

Accordingly, when the recording medium is printed on using the ink jet ink composition according to the second major aspect of the invention, curling of the recording medium and clogging of the nozzle are relieved or suppressed while the image density is further improved.

The amine compound represented by the formula (2) and used for the ink according to the second major aspect of the invention can relieve or suppress curling of the recording medium and clogging of the nozzle similarly to the amine used for the ink according to the first major aspect of the invention.

It is thought that at least one of the three substituents in the amine compound used for the ink according to the second major aspect of the invention comprises a hydrocarbon group having a hydroxyl group as the amine compound used for the ink according to the first major aspect of the invention does. It is preferable that the number of the hydrocarbon group having the hydroxyl group contained in the amine molecule, and the structure of the hydrocarbon group having the hydroxyl group contained in the amine molecule in the second major aspect are the same as those of the amine compound used for the ink according to the first major aspect of the invention.

It was confirmed from the results of investigations by the inventor of the invention that curling of the recording medium and clogging of the nozzle are relieved or suppressed while the image density is further improved, when the amine compound used for the ink according to the second major aspect of the invention is added to the ink.

This effect of further improving the image density maybe ascribed to the fact that, different from the amine compound used in the first major aspect of the invention, at least one of three substituents represented by $R_1'$, $R_2'$ and $R_3'$ of the amine compound used for the ink according to the second major aspect of the invention comprises a hydrocarbon group containing an alkyl group having at its terminal either one of —$CO_2M$ and —$SO_3M$ in which M represents an atom or an atomic group selected from hydrogen, an alkali metal, an alkaline earth metal, an ammonium group and an organic amine group (may be referred to as "alkylcarboxylic acid derivative groups" or "alkylsulfonic acid derivative groups" hereinafter). More specifically, the reason is thought that the —$CO_2M$ and —$SO_3M$ groups contained in the alkylcarboxylic acid derivative groups and alkylsulfonic acid derivative groups have a function for accelerating coagulation of pigments when the derivatives contact the recording medium.

Such effect of improving the image density may be caused by the following phenomenon.

Inside ink droplets that result when ink bombards the recording medium after being ejected from the recording head as fine droplets during printing, the amine compound containing the alkylcarboxylic acid derivative and/or alkylsulfonic acid derivative as the substituent R' (hereinafter "substituent R'" means at least any one of $R_1'$, $R_2'$ and $R_3'$) is aligned at the surface of the droplets and at the interface between ink droplets and the recording medium. Therefore, a concentration gradient of the amine molecule is formed within the ink droplets. The —$CO_2M$ or —$SO_3M$ group contained in the amine molecule inhibits the colorant in the ink from stably dispersing at the portions where the concentration of the amine molecule is high in the ink droplets, and accelerates coagulation of the a colorant. Accordingly due to this phenomenon, the colorant becomes more likely to remain on the surface of the recording medium to improve the image density.

The alkylcarboxylic acid derivative group or alkylsulfonic acid derivative group contained in the amine molecule used in the ink according to the second major aspect of the invention may contain the hydroxyl group. However, since the hydroxyl group cannot be positioned at the terminal in this case, the alkylcarboxylic acid derivative group or the alkylsulfonic acid derivative group preferably contain no hydroxyl group.

Since the number of the hydrocarbon group containing the hydroxyl group contained in the amine molecule used for the ink according to the second major aspect of the invention is most preferably 2 as described above, the number of the carboxylic acid derivative group or alkylsulfonic acid derivative group is preferably 1.

Specific examples of the amine molecule used for the ink according to the second major aspect of the invention described above include N,N-bis(hydroxyethyl)glycine, N,N-bis(hydroxyethyl)glycine sodium salt, N,N-bis(hydroxyethyl)glycine ammonium salt, N,N-bis(hydroxymethyl)glycine, N,N-bis(hydroxymethyl)glycine sodium salt, N,N-bis(hydroxymethyl)glycine ammonium salt, N,N-bis (hydroxyethyl)-2-aminoethane sulfonic acid, sodium sodium N,N-bis(hydroxyethyl)-2-aminoethane sulfonate, ammonium N,N-bis(hydroxyethyl)-2-aminoethane sulfonate, N,N- bis(hydroxymethyl)-2-aminoethane sulfonic acid, sodium N,N-bis(hydroxymethyl)-2-aminoethane sulfonate, ammonium N,N-bis(hydroxymethyl)-2-aminoethane sulfonate, and torisine sodium salt (N-[tris(hydroxymethyl)methyl]glycine sodium salt.).

The amine molecules more preferable among them include N,N-bis(hydroxyalkyl)glycine derivatives and N,N-bis(hydroxyalkyl)-2-aminoethane sulfonic acid derivatives, and it is particularly preferable that the hydroxyalkyl portion of these amine derivative molecules is hydroxyethyl.

While the content of amine compound represented by the formula (2) is not particularly limited in the ink according to the second major aspect of the invention, it is preferably in the range of 5 to 30% by mass, more preferably 13 to 25% by mass, and further preferably 15 to 20% by mass.

The curl-preventing effect cannot be obtained when the content of the amine compound represented by the formula (2) is less than 3% by mass. On the other hand, clogging may occur when the content exceeds 30% by mass.

The contents common in both inks in the first and second major aspects of the invention (both inks in both the first and second major aspects of the invention are named as the ink according to the invention hereinafter) will be described in detail below.

The amine compound used for the ink of the invention is preferably a solid in a pure state at room temperature. Consequently, the melting point or decomposition point of the amine compound is preferably 50° C. or more, more preferably 100° C. or more, and particularly 180° C. or more.

The phrase "the melting point or decomposition point of the amine compound" refers to a lower temperature of the melting point and decomposition point of the amine compound when the compound has both points.

When the amine compound has a melting point or decomposition point at 50° C. or more, the amine compound represented by the formula (1) or (2) is a solid under a general environment of use. The amine compound is remained in the recording medium after the ink has been dried, and is fixed among the cellulose fibers while the compound is aligned. Accordingly, the amine compound works as a paper strength-enhancing agent. Consequently, the amine compound is able to exhibit stronger curl-preventing effect as compared with an amine compound having a melting point or decomposition point less than 50° C. Since the amine compound functions as a paper strength-enhancing agent when its melting point or decomposition point is 50° C. or more, curl is suppressed even when letters and pictures are printed over a printed matter that has been printed with an ink containing such amine compound. Examples of the amine compound having a melting point or decomposition point of 50° C. or more include the amine compounds that have been exemplified as the amine compound used for the ink in the second major aspect of the invention.

The ink of the invention preferably has a surface tension of 40 mN/m or less, more preferably 25 mN/m to 35 mN/m.

Although conventional inks having the surface tension in the range described above were excellent in permeability and was used as a rapidly drying ink, such ink has a contradictory property that curl was liable to occur due to permeation of the ink into the recording medium. However, the ink of the invention containing the amine compound represented by the formula (1) or (2) is able to suppress curling even when the ink permeates deep into the recording medium. Consequently, the ink of the invention can retain the rapidly drying property as well as the curl-suppressing property when the surface tension of the ink of the invention is within the range as described above.

The ink of the invention may contain both the amine compound represented by the formula (1) and the amine compound represented by the formula (2) When the proportion of the former amine compound is relatively large or the proportions of both amine compounds are approximately the same, the content of all the amine compounds contained in the ink should be within the range of 10 to 30% by mass as in the ink according to the first major aspect of the invention.

On the other hand, when the proportion of the latter amine compound is relatively large, the content of all the amine compounds contained in the ink is preferably within the range of 5 to 35% by mass, although the content is not particularly limited.

-Ink Set-

The ink set of the invention will be described below. At least two inks such as a combination of cyan, magenta, yellow and black are frequently used as a set for printing using the ink. Each ink constituting the ink set contains at least water, a colorant and a water soluble organic solvent.

The invention provides, in the first major aspect, an ink set comprising at least one ink containing the amine compound represented by the formula (1) in a range of 10 to 30% by mass.

Curling of the recording medium and clogging of the nozzle are relieved or suppressed when the recording medium is printed using such ink set. The ink containing the amine compound in the ink set is basically the same as the ink in the first major aspect of the invention, except that the ink is used as a set with other inks.

While all the color inks in the ink set may contain the amine compound represented by the formula (1), it is not always necessary. In this case, it is more preferable that the ink that is easy to be used in a wide area on the recording medium contains the amine compound represented by the formula (1).

For example, color inks and pale color inks such as light color inks having a lower color density than color ink are mainly used at the portions of the recording medium that may largely affect curling such as graphs and photographs. On the other hand, since deep color inks such as a black ink are mainly used for printing letters, the ink has little influence on curling.

When the ink set comprises a combination of at least one pale color ink and at least one deep color ink, the amine compound represented by the formula (1) is preferably added in at least one pale color ink. The amine compound represented by the formula (1) may be added or not added into the deep color ink that slightly influences on curling.

In the second major aspect, the invention provides an ink set comprising at lest one ink containing the amine compound represented by the formula (2).

Curling of the recording medium and clogging of the nozzle are relieved or suppressed while the image density is further improved by printing an image on the recording medium using such ink set. The ink containing the amine compound in the ink set is basically the same as the ink in the second major aspect of the invention, except that the ink is used as a set with other inks.

While all the color inks in the ink set may contain the amine compound represented by the formula (2), it is not always necessary. In this case, it is more preferable that the ink that is easy to be used in a wide area on the recording medium contains the amine compound represented by the formula (2).

The ink of the invention may contain both the amine compound represented by the formula (1) and the amine compound represented by the formula (2). When the proportion of the former amine compound is relatively large or the proportions of both amine compounds are approximately the same, the content of all the amine compounds contained in the ink should be within the range of 10 to 30% by mass as in the ink according to the first major aspect of the invention.

On the other hand, when the proportion of the latter amine compound is relatively large, the content of all the amine compounds contained in the ink is preferably within the range of 5 to 30% by mass as in the ink set according to the second major aspect of the invention, although the content is not particularly limited.

-Ink Jet Treatment Liquid-

A colorless ink jet treatment liquid (a treatment liquid containing at least water and a water soluble organic solvent) may be used together with inks containing a colorant (inks containing at least water, a colorant and a water soluble organic solvent) for printing an image using the inks. Such treatment liquid is applied on the area of the recording medium on which the inks are applied before or after the inks are applied on the recording medium.

The treatment liquid according to the first major aspect of the invention comprises the amine compound represented by the formula (1) in a range of 10 to 30% by mass.

Curling of the recording medium and clogging of the nozzle are relieved or suppressed by printing an image on the recording medium using such ink set. Preferable structures and examples of the amine compound represented by the formula (1) are the same as described above from this point of view. The treatment liquid according to the first major aspect of the invention is particularly effective when used in combination with the inks having no curl-suppressing effect.

The treatment liquid according to the second major aspect of the invention contains the amine compound represented by the formula (2).

Curling of the recording medium and clogging of the nozzle are relieved or suppressed while the image density is further improved by printing an image on the recording medium using the treatment liquid together with the inks. Preferable structures and examples of the amine compound represented by the formula (2) are the same as described above from this pint of view. The treatment liquid according to the second major aspect of the invention is particularly effective when used in combination with the inks having no curl-suppressing effect.

The treatment liquid may contain both the amine compound represented by the formula (1) and the amine compound represented by the formula (2). When the proportion of the former amine compound is relatively large or the proportions of both amine compounds are approximately the same, the content of all the amine compounds contained in the ink should be within the range of 10 to 30% by mass as in the treatment liquid according to the first major aspect of the invention.

On the other hand, when the proportion of the latter amine compound is relatively large, the content of all the amine compounds contained in the treatment liquid is preferably within the range of 5 to 30% by mass as in the treatment liquid according to the second major aspect of the invention, although the content is not particularly limited.

-Colorant, Water-soluble Organic Solvent and Other Additives-

The colorant contained in each color constituting the ink or ink set, water-soluble organic solvent and other additives in the present invention, and the water-soluble organic solvent and other additives contained in the treatment liquid will be described below.

The colorant used in the invention may be a dye or pigment. Examples of the dye available include a direct dye, acidic dye, edible dye, basic dye, reactive dye, dispersion dye, vat dye, soluble vat dye, reactive dispersion dye and oil soluble dye.

Examples of the dye include C.I. direct black-2, -4, -9, -11, -17, -19, -22, -32, -80, -151, -154, -168, -171, -194 and -195; C.I. direct blue-1, -2, -6, -8, -22, -34, -70, -71, -76, -78, -86, -112, -142, -165, -199, -200, -201, -202, -203, -207, -218, -236, -287 and -307; C.I. direct red-1, -2, -4, -8, -9, -11, -13, -15, -20, -28, -31, -33, -37, -39, -51, -59, -62, -63, -73, -75, -80, -81. -83, -87, -90, -94, -95, -99, -101, -110, -189 and -227; C.I direct violet-2, -5, -9, -12, -18, -25, -37, -43, -66, -72, -76, -84, -92 and -107; C. I, direct yellow-1, -2, -4, -8, -11, -12, -26, -27, -28, -33, -34, -41, -44, -48, -58, -86, -87, -88, -132, -135, -142, -144 and -173; C.I. food black-1 and -2; C.I. acid black-1, -2, -7, -16, -24, -26, -28, -31, -48, -52, -63, -107, -112, -118, -119, -121, -156, -172, -194 and -208; C.I. acid blue-1, -7, -9, -15, -22, -23, -27, -29, -40, -43, -55, -59, -62, -78, -80, -81, -83, -90, -102, -104, -111, -185, -249 and -254; C.I. acid red-1, -4, -8, -13, -14, -15, -18, -21, -26, -35, -37, -52, -110, -144, -180, -249 and -257; C.I. acid yellow-1, -3, -4, -7, -11, -12, -13, -14, -18, -19, -23, -25, -34, -38, -41, -42, -44, -53, -55, -61, -71, -76, -78, -79 and -122.

These dyes may be used alone, or as a mixture of a plurality of them. The content of these dyes in the ink of the invention is preferably in the range of 0.1 to 10% by mass, more preferably in the range of 1 to 8% by mass, relative to the total mass of the ink.

Either organic pigments or inorganic pigments may be used as the pigments in the colorant of the invention.

Examples of the black pigment include carbon black pigments such as furnace black, lamp black, acetylene black and channel black such as Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1080 and Raven 1060 (manufactured by Columbian Chemicals Company); Regal 1400R, Regal 1330R, Regal 1660R, Mogul L. Black Pearls L, Monarch 700, Monarch 800, Monarch 1000, Monarch 1100, Monarch 880, Monarch 900, Monarch 1300 and Monarch 1400 (manufactured by Cabot Corporation); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (manufactured by Degssa Co.); and No. 25, No. 33, No. 40, No. 47. No. 52. No. 900. No. 2300, MCF-88, MA 600, MA 7, MA 8 and MA 100 (manufactured by Mitsubishi Chemical Co., Ltd.). However, the black pigments are not limited thereto.

Examples of the cyan pigment include C.I. Pigment Blue-1, C.I., C.I. Pigment Blue-2, C.I. Pigment Blue-3, C.I. PigmentBlue-15, C.I. PigmentBlue-15:1, C.I. PigmentBlue-15:3, C.I. Pigment Blue-15:4, C.I. Pigment Blue-16, C.I. Pigment Blue-22 and C.I. Pigment Blue-60. However, the cyan pigments are not limited thereto.

Examples of magenta pigment include C.I. Pigment Red-5, C.I. Pigment Red-7, C.I. Pigment Red-12, C.I. Pigment Red-48, C.I. PigmentRed-48: I.C.I. PigmentRed-57, C.I. Pigment Red-112, C.I. PigmentRed-122, C.I. PigmentRed-123, C.I. Pigment Red-146, C.I. Pigment Red-168, C.I. Pigment Red-184 and C.I. Pigment Red-202. However the magenta pigments are not limited thereto.

Examples of yellow pigment include C.I. PigmentYellow-1, C.I. Pigment Yellow-2, C.I. Pigment Yellow-3, C.I. Pigment Yellow-12, C.I. Pigment Yellow-13, C.I. Pigment Yellow-14, C.I. PigmentYellow-16, C.I. PigmentYellow-17, C.I.

Pigment Yellow-73, C.I. Pigment Yellow-74, C.I. Pigment Yellow-75, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-138, C.I. Pigment Yellow-151 and C.I. Pigment Yellow-154. However, the yellow pigments are not limited thereto.

These pigments may be used alone, or as a mixture of a plurality of them. The pigment used in the ink of the invention is used in the range of 0.5 to 20% by mass, preferably 2 to 10% by mass, relative to the total weight of the ink.

A pigment dispersant is preferably used together when the pigment is used as the colorant. Examples of the pigment dispersant available include polymer dispersants, anionic surfactants, cationic surfactants, amphoteric surfactants and nonionic surfactants. With respect to the polymer dispersants, polymer having hydrophobic structure part and hydrophilic structure part may effectively be used. Condensation polymers and addition polymers may be used as polymers having a hydrophobic structure part and hydrophilic structure part. Examples of the condensation polymer include known polyester dispersants.

Examples of the addition polymer include addition polymers of monomers having $\alpha,\beta$-ethylenic unsaturation bonds. A desired polymer dispersant is obtained by a copolymerization of an appropriate combination of a hydrophilic monomers having $\alpha,\beta$-ethylenic unsaturation bonds and a hydrophobic monomer having $\alpha,\beta$-ethylenic unsaturation bonds. A homopolymer of hydrophilic monomers having $\alpha,\beta$-ethylenic unsaturation bonds may be also used.

Examples of the hydrophilic monomer having $\alpha,\beta$-ethylenic unsaturation bonds include monomers having carboxyl, sulfonic acid, hydroxyl or phosphoric acid groups, for example acrylic acid, methacrylic acid, crotonic acid, itaconic acid, itaconic acid monoester, maleic acid, maleic acid monoester, fumaric acid, fumaric acid monoester, vinylsulfonic acid, styrenesulfonic acid, sulfonated vinylnaphthalene, vinyl alcohol, acrylamide, methacryloxyethyl phosphate, bismethacryloxyethyl phosphate, methacryloxyethylphenyl acid phosphate, ethyleneglycol dimethacrylate and diethyleneglycol dimethacrylate.

Examples of the hydrophobic monomer having $\alpha,\beta$-unsaturated bonds include styrene derivatives such as styrene, $\alpha$-methylstyrene and vinyltoluene; vinylcyclohexane, vinylnaphthalene, vinylnaphthalene derivatives, alkylacrylate, alkyl methacrylate, phenyl methacrylate, cycloalkyl methacrylate, alkyl crotonate, dialkyl itaconate and dialkyl maleate.

Examples of the preferable copolymer include styrene-stylenesulfonic acid copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, alkyl acrylate-acrylic acid copolymer, alkyl methacrylate-methacrylic acid copolymer, styrene-alkyl acrylate-methacrylic acid copolymer, styrene-alkyl acrylate-acrylic acid copolymer, styrene-phenyl methacrylate-methacrylic acid copolymer, and styrene-cyclohexyl methacrylate-methacrylic acid copolymer. Monomers having polyoxyethylene groups or hydroxyl groups may be appropriately copolymerized with these copolymers.

These pigment dispersants may be used alone, or as a combination of at least two of them. While the amount of addition of the pigment dispersant cannot be necessarily defined, the combined proportion is usually 0.1 to 100% by mass, preferably 1 to 70% by mass, and more preferably 3 to 50% by mass relative to the amount of the pigment.

Self-dispersing pigment may be used as the pigment of the invention. Specific examples of such pigment are Cab-o-jet200, Cab-o-jet300, IJX-253, IJX-266, IJX-273, IJX-444 and IJX-55 manufactured by Cabot Corporation, and Microjet Black CW-1 and CW-2 manufactured by Orient Chemical Industries, Ltd. However, the pigment is not limited thereto.

So-called capsulated pigments prepared by coating pigment particles with a polymer may be also used as the pigment in the invention.

A cationic surfactant, nonionic surfactant and/or anionic surfactant may be added to the ink and treatment liquid in the invention in order to control the surface tension an wettability of the ink and treatment liquid. These surfactants may be used alone, or as a mixture of a plurality of them.

The amount of addition of the surfactant to the ink is preferably 5% by mass or less, more preferably in the range of 0.01 to 3% by weight relative to the total amount of the ink.

Examples of the water-soluble organic solvent used in the invention include polyfunctional alcohols such as ethyleneglycol, diethyleneglycol, propyleneglycol, butyleneglycol, triethyleneglycol, 1,5-pentadiol, 1,2,6-hexanetriol and glycerin; polyfunctional alcohol derivatives such as ethyleneglycol monomethylether, ethyleneglycol monoethylether, ethyleneglycol monobutylether, diethyleneglycol monomethylether, diethyleneglycol monoethylether, diethyleneglycol monobutylether, diethyleneglycol monohexylether, triethyleneglycol monobutylether, propyleneglycol monobutylether and dipropyleneglycol monobutylether; nitrogen-containing solvents such as N-methylpyrrolidone and cyclohexyl pyrrolidone; alcohols such as ethanol, isopropyl alcohol, butyl alcohol and benzyl alcohol: sulfur-containing solvents such as thiodiethanol, thiodiglycerol, sulfolane and dimethylsulfoxide; and propylene carbonate and ethylene carbonate.

These water-soluble solvents may be used alone, or as a mixture of at least two of them.

While the content of the water-soluble organic solvent in the ink is not particularly limited, it is preferably 1 to 60% by mass, more preferably 5 to 40% by mass, relative to that total weight of the ink.

Other components such as polyethylene imine, polyvinyl pyrrolidone, polyethyleneglycol, cellulose derivatives such as ethyl cellulose and carboxymethyl cellulose, and other water soluble polymers; polymer emulsions such as acrylic polymer emulsion and polyurethane emulsion; and cyclodextrin, large ring amine, dendrimer, crown ether, urea and its derivatives, and acetamide may be added to the ink and treatment liquid of the invention in addition to the components described above.

Alkali metal compounds such as potassium hydroxide, sodium hydroxide and lithium hydroxide; alkaline earth metal compounds such as calcium hydroxide; acids such as sulfuric acid, hydrochloric acid and nitric acid; and slats of strong acids and weak alkali such as ammonium sulfate may be used in the ink and treatment liquid of the invention for adjusting conductivity and pH.

Other additives such as a pH buffer agent, antioxidant, fungicide, viscosity control agent, conductive agent, UV absorber and cheating agent as well as water-soluble dyes, dispersion dyes and oil soluble dyes may be added, if necessary.

<Ink Jet Recording Method>

In the first major aspect, the invention provides an ink jet recording method comprising forming an image by adhering an ink to a recording medium by using the ink of the first major aspect of the invention or the ink set of the first major aspect of the invention, or forming an image by adhering a treatment liquid and an ink to a recording medium by using the treatment liquid of the first major aspect of the invention and an ink together.

Accordingly, curling of the recording medium and clogging of the nozzle are relieved or by printing the images on the recording medium by taking advantage of the ink jet recording method according to the first major aspect of the invention.

The invention also provides, in the second major aspect, an ink jet recording method comprising forming an image by adhering an ink to a recording medium by using the ink of the second major aspect of the invention or the ink set of the second major aspect of the invention, or forming an image by adhering a treatment liquid and an ink to a recording medium by using the treatment liquid of the second major aspect of the invention and an ink together.

Accordingly, curling of the recording medium and clogging of the nozzle are relieved or suppressed while the image density is improved by printing the images on the recording medium by taking advantage of the ink jet recording method according to the second major aspect of the invention.

In more detail, the image is formed on the recording medium by ejecting ink droplets, or ink droplets and treatment liquid droplets, through an orifice depending on recording signals in the ink jet recording method of the invention.

Examples of the recording method used in ink jet recording include a so-called static control method in which the ink, or the ink and treatment liquid are ejected by taking advantage of an static attraction, a so-called piezo-method in which the ink, or the ink and treatment liquid are ejected by taking advantage of a oscillation pressure of a piezoelectric element, and a so-called thermal ink jet method in which droplets of the ink and treatment liquid are formed by taking advantage of a pressure that is generated from air bubble formation and growth with heating the ink and treatment liquid. The thermal ink jet method and piezo-method are particularly preferable among them since full-color images may be provided using a small size and inexpensive ink jet recording apparatus.

<Ink Jet Recording Apparatus>

In the first major aspect, the invention provides an ink jet recording apparatus comprising at least a recording head including a liquid ejection surface having a nozzle for ejecting a liquid, and a recording medium transfer section for transferring a recording medium in one direction while the recording medium faces the liquid ejection surface and a shortest distance between the recording medium and liquid ejection surface is constantly maintained. During printing, an image is formed by ejecting the liquid onto a surface of the recording medium from the liquid ejection surface while moving the recording head in a direction substantially perpendicular to the transfer direction of the recording medium. The ink jet recording apparatus uses, as the liquid, the ink according to the first major aspect of the invention, the ink set according to the first major aspect of the invention, or the treatment liquid according to the first major aspect of the invention and an ink (an ink set) together.

Accordingly, curling of the recording medium and clogging of the nozzle is relieved or suppressed by printing the images on the recording medium using the ink jet recording apparatus according to the first major aspect of the invention.

In the second major aspect, the invention provides an ink jet recording apparatus comprising at least a recording head including a liquid ejection surface having a nozzle for ejecting a liquid, and a recording medium transfer section for transferring a recording medium in one direction while the recording medium faces the liquid ejection surface and a shortest distance between the recording medium and the liquid ejection surface is constantly maintained. During printing, an image is formed by ejecting the liquid onto a surface of the recording medium from the liquid ejection surface while moving the recording head in a direction substantially perpendicular to the transfer direction of the recording medium. The ink jet recording apparatus uses, as the liquid, the ink according to the second major aspect of the invention, the ink set according to the second major aspect of the invention, or the treatment liquid according to the second major aspect of the invention and an ink (an ink set) together.

Accordingly, curling of the recording medium and clogging of the nozzle is relieved or suppressed while the image density is further improved by printing the images on the recording medium using the ink jet recording apparatus according to the second major aspect of the invention.

Known recording methods such as the piezo-method and thermal ink jet method as used in the ink jet recording method of the invention may be used as the recording method used in the ink jet recording apparatus of the invention. Examples of known ink jet recording apparatus are described in JP-A No. 2002-275401, which is incorporated by reference herein in its entirety. A liquid is ejected from the nozzle, and the recording head is transferred in substantially perpendicular direction to the transfer direction of the recording medium during the printing process in accordance with image signals sent to the recording head. The ink jet printer of the invention may further comprise known constructions, members and functions other than those described above, if necessary.

When at least two liquids such as the ink set of the invention or a combination of a ink (or an ink set) and the treatment liquid of the invention are used as the liquids for printing, the recording head used has an ejection surface comprising at least two nozzles for independently ejecting the at least two liquids.

When an ink (or an ink set) is used in combination with the treatment liquid of the invention, the treatment liquid is applied on the region of the recording medium on which the ink is applied. The order of applying the ink and treatment liquid is not particularly limited, and the treatment liquid may be applied after applying the ink or vice versa.

The shortest distance between the liquid ejection surface and the plane surface of the recording medium is preferably in the range of 1.0 to 2.0 mm, more preferably in the range of 1.2 to 1.7 mm, in the ink jet recording apparatus of the invention.

The air stream generated by scanning of the recording head and/or transfer of the recording medium may disturb the ejection direction of the ink and treatment liquid when the shortest distance between the liquid ejection surface and the plane surface of the recording medium is less than 1.0 mm. Consequently, the ink and treatment liquid is ejected in a wrong direction to cause irregularity and moire of the image.

When the shortest distance between the liquid ejection surface and the plane surface of the recording medium exceeds 2.0 mm, on the other hand, the bombardment position of the droplet on the recording medium may be hardly controlled, since the distance for allowing the ink and treatment liquid ejected from the liquid ejection surface to arrive at the recording medium is elongated. Consequently, fine images may be hardly formed.

The shortest distance between the liquid ejection surface and the plane surface of the recording medium is adjusted to be within the range of 1.0 to 2.0 mm in the conventional ink jet recording apparatus in order to avoid the problems described above. However, the recording medium is swelled and undulated due to curling of the recording medium immediately after printing when the largest length of the recording head, which is mounted on the ink jet recording apparatus, in the transfer direction of the recording medium (hereinafter, occasionally abbreviated as "recording head length") is 1 inch (2.54 cm) or more. Consequently, the conventional ink jet recording apparatus may suffer a problem in that the recording medium contacts the recording head.

The recording medium is transferred to a position that enables the recording medium to avoid from contacting the head before the printed portion of the recording medium is swelled when the head length is less than 1 inch. Accordingly, the recording head hardly contacts the recording medium. However, when the length of the recording head is 1 inch or more, it takes a long time before the recording medium is transferred to a position where the recorded portions swelled by adhesion of the ink and treatment liquid does not contact the printing head. Some measures were necessary for reducing the possibility of contact between the printing head and the recording medium.

On the other hand, the ink of the invention or the ink set of the invention is used as the liquid used for printing in the ink jet recording apparatus of the invention, or the treatment liquid of the invention and an ink (an ink set) are used together as the liquids used for printing in the recording apparatus of the invention. Consequently, undulating of the recording medium immediately after printing can be suppressed.

In other words, the troubles of contact between the recording medium and recording head can be solved in the ink jet recording apparatus of the invention, even when a recording head with a length of 1 inch or more, which has often caused troubles, is mounted.

The length of the recording head is preferably 7.5 cm or less, since the recording medium may contact the recording head when the length is 7.5 cm or more.

EXAMPLES

While the present invention is described in more detail with reference to examples, the invention is by no means limited to these examples.

Example 1

After mixing the components below, an ink is prepared by filtering with a membrane filter with a pore size of 5 μm.
Dispersed solution of self-dispersing pigment (CAB-O-JET 300, manufactured by Cabot Corporation): 3% by mass
Diethyleneglycol: 1.5% by mass
N,N-bis(hydroxyethyl)glycine: 15% by mass
Sodium hydroxide: 1.5% by mass
Olfin E10110 (manufactured by Nissin Chemical Industry Co.,Ltd.): 0.2% by mass
Pure water: the balance Example 2

After mixing the components below, an ink is prepared by filtering with a membrane filter with a pore size of 5 μm.
Dispersed solution of self-dispersing pigment (CAB-O-JET 200, manufactured by Cabot Corporation): 3% by mass
Glycerin: 10% by mass
Sulfolane: 10% by mass
N,N-bis(hydroxyethyl)-2-aminoethane sulfonic acid: 15% by mass
Sodium hydroxide: 1.2% by mass
Olfin E10110 (manufactured by Nissin Chemical Industry Co.,Ltd.): 0.2% by mass
Pure water: the balance Example 3

After mixing the components below, an ink is prepared by filtering with a membrane filter with a pore size of 5 μm.
Dispersed solution of self-dispersing pigment (CAB-O-JET 300, manufactured by Cabot Corporation): 3% by mass
diethyleneglycol: 15% by mass
N,N-bis(hydroxyethyl)glycine: 15% by mass
Sodium hydroxide: 1.5% by mass
E215 (manufactured by Nippon Oil & Fats Co., Ltd.): 0.5% by mass
Pure water: the balance Example 4

After mixing the components below, an ink is prepared by filtering with a membrane filter with a pore size of 5 μm.
Dispersed solution of self-dispersing pigment (CAB-O-JET 253, manufactured by Cabot Corporation): 3% by mass
propyleneglycol: 10% by mass
ethyleneglycol: 5% by mass
butylcarbitol: 3% by mass
N,N-bis(hydroxyethyl)-2-aminoethane sulfonic acid: 35% by mass
Sodium hydroxide: 2.4% by mass
Olfin E1010 (manufactured by Nissin Chemical Industry Co., Ltd): 0.5% by mass
Pure water: the balance Example 5

After mixing the components below, an ink is prepared by filtering with a membrane filter with a pore size of 5 μm.
Dispersed solution of self-dispersing pigment (IJX-266, manufactured by Cabot Corporation): 3% by mass
diethyleneglycol: 15% by mass
N,N-bis(hydroxyethyl)-2-aminoethane sulfonic acid: 3% by mass
Sodium hydroxide: 0.01% by mass
Olfin E1010 (manufactured by Nissin Chemical Industry Co., Ltd) 0.2% by mass
Pure water: the balance Example 6

After mixing the components below, an ink is prepared by filtering with a membrane filter with a pore size of 5 μm.
C.I. Acid Blue-9: 6% by mass
Diethyleneglycol: 15% by mass
N,N-bis(hydroxyethyl)glycine: 10% by mass
Sodium hydroxide: 0.3% by mass
Olfin E1010 (manufactured by Nissin Chemical Industry Co.,Ltd.): 0.05% by mass
Pure water: the balance Example 7

After mixing the components below, an ink is prepared by filtering with a membrane filter with a pore size of 5 μm.
Food black 2 (manufactured by Zeneca Co.): 5% by mass
Diethyleneglycol: 17% by mass Tris(2-hydroxyethyl)amine: 10% by mass
Olfin E1010 (manufactured by Nissin Chemical Industry Co.,Ltd.): 1% by mass
Pure water: the balance Example 8

After mixing the components below, an ink is prepared by filtering with a membrane filter with a pore size of 5 μm.
C.I. Acid Blue-9: 6% by mass
Diethyleneglycol: 5% by mass
Tris(2-hydroxyethyl)amine: 30% by mass
Olfin E1010 (manufactured by Nissin Chemical Industry Co.,Ltd.): 1% by mass
Pure water: the balance Example 9

After mixing the components below, an ink is prepared by filtering with a membrane filter with a pore size of 5 μm.
Dispersed solution of self-dispersing pigment (IJX-253, manufactured by Cabot Corporation): 3% by mass
Diethyleneglycol: 10% by mass
2,2-bis(hydroxymethyl)-2,2',2"-nitrilotriethanol: 20% by mass
Olfin E1010 (manufactured by Nissin Chemical Industry Co.,Ltd.): 1% by mass
Pure water: the balance Example 10

After mixing the components below, an ink is prepared by filtering with a membrane filter with a pore size of 5 μm.
Dispersed solution of self-dispersing pigment (CAB-O-JET 300, manufactured by Cabot Corporation): 3% by mass
Glycerin: 25% by mass
N,N-bis(hydroxyethyl)-2-aminoethane sulfonic acid: 5% by mass
Sodium hydroxide: 0.3% by mass
Olfin E1010 (manufactured by Nissin Chemical Industry Co.,Ltd.): 1% by mass
Pure water: the balance Example 11

After mixing the components below, an ink is prepared by filtering with a membrane filter with a pore size of 5 μm.
Dispersed solution of self-dispersing pigment (IJX-253, manufactured by Cabot Corporation): 3% by mass
Glycerin: 5% by mass
N,N-bis(hydroxyethyl)-2-aminoethane sulfonic acid: 30% by mass
Sodium hydroxide: 2.4% by mass
Olfin E1010 (manufactured by Nissin Chemical Industry Co.,Ltd.): 1% by mass
Pure water: the balance Comparative Example 1

After mixing the components below, an ink is prepared by filtering with a membrane filter with a pore size of 5 μm.
Dispersed solution of self-dispersing pigment (CAB-O-JET 300, manufactured by Cabot Corporation): 3% by mass
Diethyleneglycol: 10% by mass
Butylcarbitol: 10% by mass
E215 (manufactured by Nippon Oil & Fats Co., Ltd.): 1% by mass
Pure water: the balance Comparative Example 2

After mixing the components below, an ink is prepared by filtering with a membrane filter with a pore size of 5 μm.
Dispersed solution of self-dispersing pigment (IJX 444, manufactured by Cabot Corporation): 3% by mass
Diethyleneglycol: 15% by mass
Glycine: 15% by mass
Sodium hydroxide: 1.5% by mass
Olfin E1010 (manufactured by Nissin Chemical Industry Co.,Ltd.): 0.2% by mass
Pure water: the balance Comparative Example 3

After mixing the components below, an ink is prepared by filtering with a membrane filter with a pore size of 5 μm.
Dispersed solution of self-dispersing pigment (IJX 253, manufactured by Cabot Corporation): 3% by mass
Diethyleneglycol: 5% by mass
Glycine: 15% by mass
Olfin E1010 (manufactured by Nissin Chemical Industry Co.,Ltd.): 0.05% by mass
Pure water: the balance Comparative Example 4

After mixing the components below, an ink is prepared by filtering with a membrane filter with a pore size of 5 μm.
Dispersed solution of self-dispersing pigment (IJX 253, manufactured by Cabot Corporation): 3% by mass
Diethyleneglycol: 5% by mass
Betaine: 15% by mass
Olfin E10110 (manufactured by Nissin Chemical Industry Co.,Ltd.): 0.5% by mass
Pure water: the balance Comparative Example 5

After mixing the components below, an ink is prepared by filtering with a membrane filter with a pore size of 5 μm.
C.I. Direct Blue-199: 3% by mass
Glycerin: 30% by mass
Tris(2-hydroxyethyl)amine: 5% by mass
Olfin E1010 (manufactured by Nissin Chemical Industry Co., Ltd.) 2% by mass
Pure water: the balance Comparative Example 6

After mixing the components below, an ink is prepared by filtering with a membrane filter with a pore size of 5 μm.
C.I. Direct Blue-199: 3% by mass
Glycerin: 3% by mass
Tris(2-hydroxyethyl)amine: 35% by mass
Olfin E1010 (manufactured by Nissin Chemical Industry Co.,Ltd.): 2% by mass
Pure water: the balance <Evaluation>

Curling, image density, clogging and surface tension with respect to Examples 1 to 11 and Comparative Examples 1 to 6 are measured and evaluated. The results are shown in Table 1 together with the melting point or decomposition point of the amine added.

The numerical values marked by "dec" in the column of "melting point or decomposition point of the amine" in Table 1 denote the decomposition point.

TABLE 1

| | Ink | | | | | |
|---|---|---|---|---|---|---|
| | Amine content (mass %) | Melting or decomposition point of amine (°C.) | Surface tension (mN/m) | Result of evaluation | | |
| | | | | Curling | Image density | Clogging |
| Example 1 | 15 | 190 (dec) | 33 | a | a | a |
| Example 2 | 10 | 156 | 33 | a | a | a |
| Example 3 | 15 | 190 (dec) | 32 | a | a | a |
| Example 4 | 35 | 156 | 28 | a | a | b |
| Example 5 | 3 | 156 | 36 | b | b | a |
| Example 6 | 10 | 190 (dec) | 42 | a | a | a |
| Example 7 | 10 | 21 | 32 | a | b | a |
| Example 8 | 30 | 21 | 36 | a | a | a |
| Example 9 | 20 | 104 | 30 | a | a | a |
| Example 10 | 5 | 156 | 35 | a | a | a |
| Example 11 | 30 | 156 | 32 | a | a | a |
| Comparative example 1 | 0 | — | 37 | d | d | b |
| Comparative example 2 | 15 | 290 (dec) | 32 | d | b | c |
| Comparative example 3 | 15 | 290 (dec) | 42 | d | b | d |
| Comparative example 4 | 15 | 310 (dec) | 33 | d | d | c |
| Comparative example 5 | 5 | 21 | 28 | d | d | b |
| Comparative example 6 | 35 | 21 | 28 | a | c | d |

The evaluation criteria of curl, image density, clogging and surface tension in Table 1 are as follows.

(1) Measurement of Curling

The inks manufactured in each example and comparative example are filled in a recording head of a commercially available ink jet printer Work Center B900N (manufactured by Fuji Xerox Co., Ltd.). An a rectangular monochromatic solid image with a length of 270 mm and a width of 190 mm is printed on a commercially available regular paper P (A4 seize, 297 mm×210 mm, manufactured by Fuji Xerox Office Supply Co., Ltd.). The height of warp of the paper is measured after placing it on an office desk at 23° C. and 55% RH. The height of warp denotes a vertical distance from the desk plane to the edge of the paper when the edge is lifted up from the surface of the desk by curling. Evaluation criteria are as follows:
a: warp height, less than 20 mm
b: warp height, 20 mm or more and less than 40 mm
c: warp height, 40 mm or more and less than 60 mm
d: warp height, 60 mm or more, or the paper is rounded into a cylinder (2) Image Density The image density at the solid printing region of the printed matter used in the curl test above is measured with a photo-densitometer X-Rite MODEL 404 (manufactured by X-Rite Co.). Evaluation criteria are as follows:
a: optical density, 1.30 or more
b: optical density, 1.20 or more and less than 1.30
c: optical density, 1.10 or more and less than 1.20
d: optical density, less than 1.10

(3) Clogging

After continuously printing 10 sheets of solid images under the same condition as in the measurement of curl, nozzle check patterns are output to confirm clog of the nozzle and occurrence of directional error. Evaluation criteria are as follows:
a: no clogging and no directional error
b: no clogging, and incidence of the directional error is less than 1%.
c: incidence of clogging is less than 1% of all the nozzles, and incidence of the directional error is less than 3% of all the nozzle
d: incidence of clogging is 1% or more of all the nozzles, and incidence of the directional error is 3% or more of all the nozzle (4) Surface Tension The surface tension is measured at 23° C. and 55% RH using Whilhelmy surface tension meter (manufactured by Kyowa Interface Science Co.,Ltd.).

As described in the above, in a first major aspect, the invention provides an ink jet ink composition, ink set, ink jet treatment liquid, ink jet recording method and ink jet recording apparatus that enables to relieve or suppress curling of the recording medium and clogging of the nozzle.

In a second major aspect, the invention provides an ink jet ink composition, ink jet treatment liquid, ink jet recording method and ink jet recording apparatus that enables to relieve or suppress curling of the recording medium and clogging of the nozzle while the image density is further improved.

What is claimed is:

1. An ink jet ink composition comprising at least water, a colorant and a water-soluble organic solvent, wherein the ink jet ink composition comprises at least one amine compound represented by the following formula (1) in a range of more than 10% to 30% by mass:

Formula (1)

wherein the amine compound represented by the formula (1) is any one of primary to tertiary amine compounds; at least two of the three substituents represented by $R_1$, $R_2$ and $R_3$ in the formula (1) comprise a hydrocarbon group having a hydroxyl group; none of the three substituents contain an alkyl group having at its terminal either one of —$CO_2M$ and —$SO_3M$ in which M represents an atom or an atomic group selected from hydrogen, an alkali metal, an alkaline earth metal, an ammonium group and an organic amine group; and none of the three substituents represented by $R_1$, $R_2$ and $R_3$ is linked to the nitrogen atom N of formula (1) through a carbon atom which is linked to fewer than three other atoms in addition to the nitrogen atom N, wherein a melting point or decomposition point of the amine compound is 50° C. or more, and a surface tension of the ink composition is 40 mN/m or less.

2. An ink jet ink composition according to claim 1, wherein at least one hydroxyl group is positioned at the terminal of hydrocarbon group having the hydroxyl group.

3. An ink jet ink composition according to claim 1, wherein at least one hydrocarbon group having a hydroxyl group comprises a hydroxyalkyl group.

4. An ink jet ink composition according to claim 1, wherein at least one hydrocarbon group having a hydroxyl group comprises a linear hydroxyalkyl group having 1 to 5 carbon atoms.

5. The ink jet ink composition according to claim 1, wherein the melting point or decomposition point of the amine compound is 100° C. or more.

6. An ink jet recording method comprising forming an image by adhering an ink jet ink composition comprising at least water, a colorant and a water soluble organic solvent, to a recording medium, wherein the ink jet ink composition comprises at least one amine compound represented by the following formula (1) in a range of more than 10% to 30% by mass:

Formula (1)

wherein the amine compound represented by the formula (1) is any one of primary to tertiary amine compounds; at least two of the three substituents represented by $R_1$, $R_2$ and $R_3$ in the formula (1) comprise a hydrocarbon group having a hydroxyl group; none of the three substituents contain an alkyl group having at its terminal either one of —$CO_2M$ and —$SO_3M$ in which M represents an atom or an atomic group selected from hydrogen, an alkali metal, an alkaline earth metal, an ammonium group and an organic amine group; and none of the three substituents represented by $R_1$, $R_2$ and $R_3$ is linked to the nitrogen atom N of formula (1) through a carbon atom which is linked to fewer than three other atoms in addition to the nitrogen atom N, wherein a melting point or decomposition point of the amine compound is 50° C. or more, and a surface tension of the ink composition is 40 mN/m or less.

7. The ink jet recording method according to claim 6, wherein the melting point or decomposition point of the amine compound is 100° C. or more.

8. An ink jet recording apparatus comprising at least a recording head including a liquid ejection surface having a nozzle for ejecting a liquid, and a recording medium transfer section for transferring a recording medium in one direction while the recording medium faces the liquid ejection surface and a shortest distance between the recording medium and the liquid ejection surface is constantly maintained, wherein:

during printing, an image is formed by ejecting the liquid onto a surface of the recording medium from the liquid ejection surface while moving the recording head in a direction substantially perpendicular to the transfer direction of the recording medium;

an ink jet ink composition comprising at least water, a colorant and a water soluble organic solvent is used as the liquid; and the ink jet ink composition comprises at least one amine compound represented by the following formula (1) in a range of more than 10% to 30% by mass,

Formula (1)

wherein the amine compound represented by the formula (1) is any one of primary to tertiary amine compounds; at least two of the three substituents represented by $R_1$, $R_2$ and $R_3$ in the formula (1) comprise a hydrocarbon group having a hydroxyl group; none of the three substituents contain an alkyl group having at its terminal either one of —$CO_2M$ and —$SO_3M$ in which M represents an atom or an atomic group selected from hydrogen, an alkali metal, an alkaline earth metal, an ammonium group and an organic amine group; and none of the three substituents represented by $R_1$, $R_2$ and $R_3$ is linked to the nitrogen atom N of formula (1) through a carbon atom which is linked to fewer than three other atoms in addition to the nitrogen atom N, wherein a melting point or decomposition point of the amine compound is 50° C. or more, and a surface tension of the ink composition is 40 mN/m or less.

9. An ink jet recording apparatus according to claim 8, wherein the shortest distance between the liquid ejection surface and the recording medium is in a range of 1.0 mm to 2.0 mm, and a largest length of the liquid ejection surface in the recording medium transfer direction is 2.54 cm or more.

10. The ink jet recording apparatus according to claim 8, wherein the melting point or decomposition point of the amine compound is 100° C. or more.

11. An ink set comprising at least two inks which each comprise water, a colorant and a water soluble organic solvent, wherein at least one ink in the ink set comprises at least one amine compound represented by the following formula (1) in a range of more than 10% to 30% by mass:

Formula (1)

wherein the amine compound represented by the formula (1) is any one of primary to tertiary amine compounds; at least two of the three substituents represented by $R_1$, $R_2$ and $R_3$ in the formula (1) comprise a hydrocarbon group having a hydroxyl group; none of the three substituents contain an alkyl group having at its terminal either one of —$CO_2M$ and —$SO_3M$ in which M represents an atom or an atomic group selected from hydrogen, an alkali metal, an alkaline earth metal, an ammonium group and an organic amine group; and none of the three substituents represented by $R_1$, $R_2$ and $R_3$ is linked to the nitrogen atom N of formula (1) through a carbon atom which is linked to fewer than three other atoms in addition to the nitrogen atom N, wherein a melting point or decomposition point of the amine compound is 50° C. or more, and a surface tension of the at least one ink in the ink set comprising the amine compound is 40 mN/m or less.

12. The ink set according to claim 11, wherein the melting point or decomposition point of the amine compound is 100° C. or more.

13. An ink jet recording method comprising forming an image by using an ink set containing at least two inks comprising at least water, a colorant and a water soluble organic solvent, and by adhering an ink of the ink set to a recording medium, wherein at least one ink of the ink set comprises at least one amine compound represented by the following formula (1) in a range of more than 10% to 30% by mass:

Formula (1)

wherein the amine compound represented by the formula (1) is any one of primary to tertiary amine compounds; at least two of the three substituents represented by $R_1$, $R_2$ and $R_3$ in the formula (1) comprise a hydrocarbon group having a hydroxyl group; none of the three substituents contain an alkyl group having at its terminal either one of —CO$_2$M and —SO$_3$M in which M represents an atom or an atomic group selected from hydrogen, an alkali metal, an alkaline earth metal, an ammonium group and an organic amine group; and none of the three substituents represented by R$_1$, R$_2$ and R$_3$ is linked to the nitrogen atom N of formula (1) through a carbon atom which is linked to fewer than three other atoms in addition to the nitrogen atom N, wherein a melting point or decomposition point of the amine compound is 50° C. or more, and a surface tension of the at least one ink in the ink set comprising the amine compound is 40 mN/m or less.

14. The ink jet recording method according to claim 13, wherein the melting point or decomposition point of the amine compound is 100° C. or more.

15. An ink jet recording apparatus comprising at least a recording head including a liquid ejection surface having at least two nozzles for independently ejecting at least two liquids, and a recording medium transfer section for transferring a recording medium in one direction while the recording medium faces the liquid ejection surface and a shortest distance between the recording medium and the liquid ejection surface is constantly maintained, wherein:

during printing, an image is formed by ejecting the at least two liquids onto a surface of the recording medium from the liquid ejection surface while moving the recording head in a direction substantially perpendicular to the transfer direction of the recording medium;

an ink set comprising at least two inks comprising at least water, a colorant and a water soluble organic solvent is used as the at least two liquids; and at least one ink in the ink set comprises at least one amine compound represented by the following formula (1) in a range of more than 10% to 30% by mass,

Formula (1)

wherein the amine compound represented by the formula (1) is any one of primary to tertiary amine compounds; at least two of the three substituents represented by R$_1$, R$_2$ and R$_3$ in the formula (1) comprise a hydrocarbon group having a hydroxyl group; none of the three substituents contain an alkyl group having at its terminal either one of —CO$_2$M and —SO$_3$M in which M represents an atom or an atomic group selected from hydrogen, an alkali metal, an alkaline earth metal, an ammonium group and an organic amine group; and none of the three substituents represented by R$_1$, R$_2$ and R$_3$ is linked to the nitrogen atom N of formula (1) through a carbon atom which is linked to fewer than three other atoms in addition to the nitrogen atom N, wherein a melting point or decomposition point of the amine compound is 50° C. or more, and a surface tension of the at least one ink in the ink set comprising the amine compound is 40 mN/m or less.

16. The ink jet recording apparatus according to claim 15, wherein the melting point or decomposition point of the amine compound is 100° C. or more.

17. A colorless ink jet treatment liquid which is used together with an ink jet ink composition comprising at least water, a colorant and a water soluble organic solvent, during printing, and comprises at least water and a water soluble organic solvent, wherein the ink jet treatment liquid comprises at least one amine compound represented by the following formula (1) in a range of more than 10% to 30% by mass:

Formula (1)

wherein the amine compound represented by the formula (1) is any one of primary to tertiary amine compounds; at least two of the three substituents represented by R$_1$, R$_2$ and R$_3$ in the formula (1) comprise a hydrocarbon group having a hydroxyl group; none of the three substituents contain an alkyl group having at its terminal either one of —CO$_2$M and —SO$_3$M in which M represents an atom or an atomic group selected from hydrogen, an alkali metal, an alkaline earth metal, an ammonium group and an organic amine group; and none of the three substituents represented by R$_1$, R$_2$ and R$_3$ is linked to the nitrogen atom N of formula (1) through a carbon atom which is linked to fewer than three other atoms in addition to the nitrogen atom N, wherein a melting point or decomposition point of the amine compound is 50° C. or more, and a surface tension of the ink composition is 40 mN/m or less.

18. The colorless ink jet treatment liquid according to claim 17, wherein the melting point or decomposition point of the amine compound is 100° C. or more.

19. An ink jet recording method comprising forming an image by adhering an ink jet ink composition comprising at least water, a colorant and a water soluble organic solvent, and a colorless ink jet treatment liquid comprising at least water and a water soluble organic solvent, to approximately the same region on a recording medium, wherein the ink jet treatment liquid comprises at least one amine compound represented by the following formula (1) in a range of more than 10% to 30% by mass:

Formula (1)

wherein the amine compound represented by the formula (1) is any one of primary to tertiary amine compounds; at least two of the three substituents represented by R$_1$, R$_2$ and R$_3$ in the formula (1) comprise a hydrocarbon group having a hydroxyl group; none of the three substituents contain an alkyl group having at its terminal either one of —CO$_2$M and —SO$_3$M in which M represents an atom or an atomic group selected from hydrogen, an alkali metal, an alkaline earth metal, an ammonium group and an organic amine group; and none of the three substituents represented by R$_1$, R$_2$ and R$_3$ is linked to the nitrogen atom N of formula (1) through a carbon atom which is linked to fewer than three other atoms in addition to the nitrogen atom N, wherein a melting point or decomposition point of the amine compound is 50° C. or more, and a surface tension of the ink composition is 40 mN/m or less.

20. The ink jet recording method according to claim 19, wherein the melting point or decomposition point of the amine compound is 100° C. or more.

21. An ink jet recording apparatus comprising at least a recording head including a liquid ejection surface comprising at least two nozzles for independently ejecting at least two liquids, and a recording medium transfer section for transferring a recording medium in one direction while the recording medium faces the liquid ejection surface and a shortest distance between the recording medium and the liquid ejection surface is constantly maintained, wherein:

during printing, an image is formed by ejecting the at least two liquids onto a surface of the recording medium from the liquid ejection surface while moving the recording head in a direction substantially perpendicular to the transfer direction of the recording medium;

an ink jet ink composition comprising at least water, a colorant and a water soluble organic solvent, and a colorless ink jet treatment liquid comprising at least water and a water soluble organic solvent are used as the at least two liquids; and the ink jet treatment liquid comprises at least one amine compound represented by the following formula (1) in a range of more than 10% to 30% by mass:

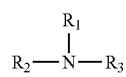

Formula (1)

wherein the amine compound represented by the formula (1) is any one of primary to tertiary amine compounds; at least two of the three substituents represented by $R_1$, $R_2$ and $R_3$ in the formula (1) comprise a hydrocarbon group having a hydroxyl group; none of the three substituents contain an alkyl group having at its terminal either one of —$CO_2M$ and —$SO_3M$ in which M represents an atom or an atomic group selected from hydrogen, an alkali metal, an alkaline earth metal, an ammonium group and an organic amine group; and none of the three substituents represented by $R_1$, $R_2$ and $R_3$ is linked to the nitrogen atom N of formula (1) through a carbon atom which is linked to fewer than three other atoms in addition to the nitrogen atom N, wherein a melting point or decomposition point of the amine compound is 50° C. or more, and a surface tension of the ink composition is 40 mN/m or less.

22. The ink jet recording apparatus according to claim 21, wherein the melting point or decomposition point of the amine compound is 100° C. or more.

* * * * *